United States Patent Office 3,075,969
Patented Jan. 29, 1963

3,075,969
11β,12β-EPOXYPREGNANE-3,20-DIONE
Josef E. Herz and Josef Fried, New Brunswick, N.J., assignors to Olin Mathieson Chemical Corporation, New York, N.Y., a corporation of Virginia
No Drawing. Filed July 1, 1955, Ser. No. 519,682
1 Claim. (Cl. 260—239.55)

This invention relates to the synthesis of valuable steroids; and has for its object the provision of (I) an advantageous process of preparing steroids of the pregnane (including the allopregnane, pregnene and pregnadiene) series having a 12α-halogen substituent and an 11-keto or 11β-hydroxy substituent, and of (II) certain steroids useful themselves as physiologically active steroids or in the preparation of physiologically active steroid derivatives.

The process of this invention essentially comprises: (a) converting a $\Delta^{11}$-steroid of the pregnene (including the allopregnene, pregnadiene and pregnatriene) series into the corresponding 12α-bromo-11β-hydroxy steroid of the pregnane (including the allopregnane, pregnene, and pregnadiene) series; (b) converting the latter into the corresponding 11β,12β-epoxy derivative thereof; (c) converting the 11β,12β-epoxy derivative into the corresponding 12α-halo-11β-hydroxy derivative thereof (when the halo group is bromine, steps (b) and (c) can, of course, be eliminated); (d) converting said 12α-halo-11β-hydroxy derivative to the corresponding 4β-bromo (or 2,4-dibromo) derivative, and thence by dehydrobromination to the corresponding $\Delta^4$-pregnene (or a mixture of the corresponding $\Delta^{1,4}$-pregnadiene and $\Delta^{4,6}$-pregnadiene) derivative (if the initial $\Delta^{11}$-steroid contains the requisite 4,5- and/or 1,2;4,5- and 4,5;6,7-unsaturation, step (d) can, of course, be eliminated); and (e) optionally oxidizing the 11β-hydroxy steroid, thus formed, to the corresponding 11-keto derivative.

The compounds of this invention comprise: (A) the intermediate 11β,12β-epoxy steroids of the pregnane (including the allopregnane, pregnene and pregnadiene) series; (B) the intermediate 12α-halo-11β-hydroxy steroids of the pregnane (including the allopregnane) series, wherein the halo radical is chlorine or fluorine (i.e. a halogen of atomic weight greater than 18 and less than 36); (C) the intermediate 12α-halo-4β-bromo-11β-hydroxy steroids of the pregnane series; (D) the intermediate 12α-halo-2,4-dibromo-11β-hydroxy steroids of the pregnane (including the allopregnane) series; and (E) the physiologically active 12α-halo-11β-hydroxy (or 11-keto)-$\Delta^4$-steroids of the pregnene (including the $\Delta^{1,4}$- and $\Delta^{4,6}$-pregnadiene) series.

For a clearer understanding of the foregoing general and following detailed description of the processes of this invention, reference is made to the following schematic analysis:

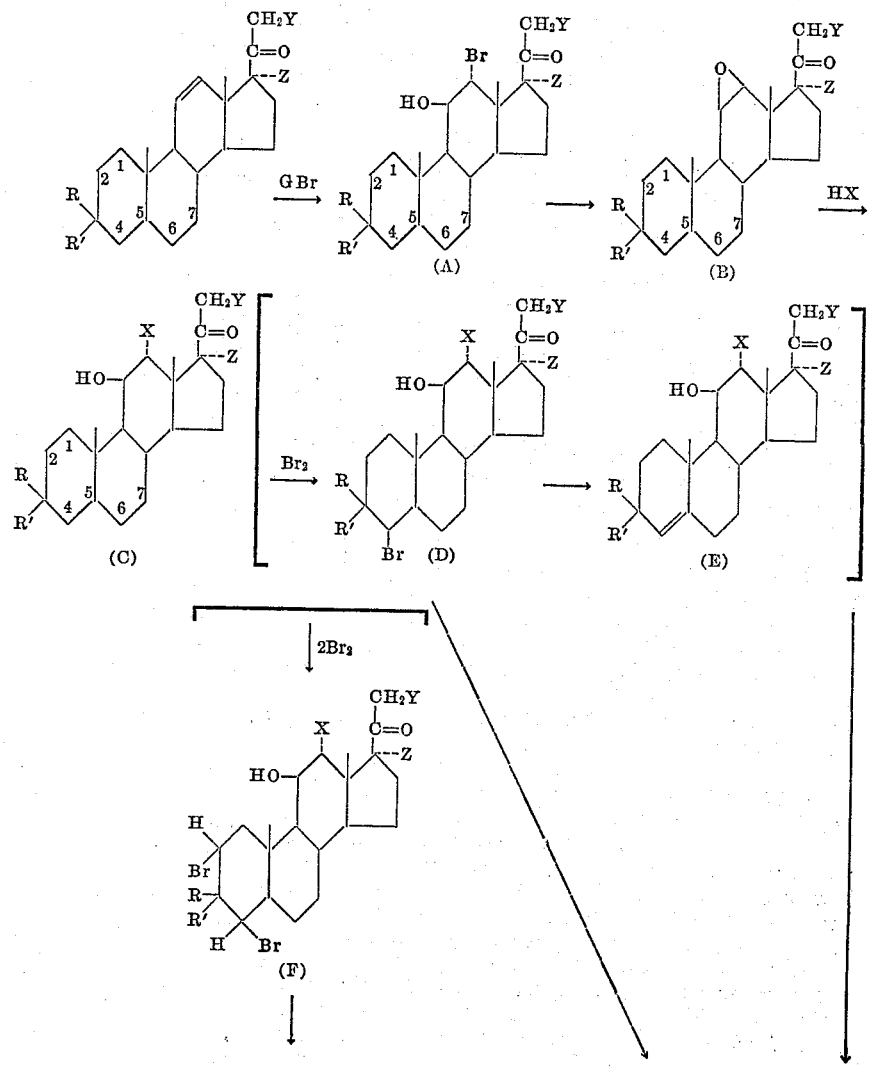

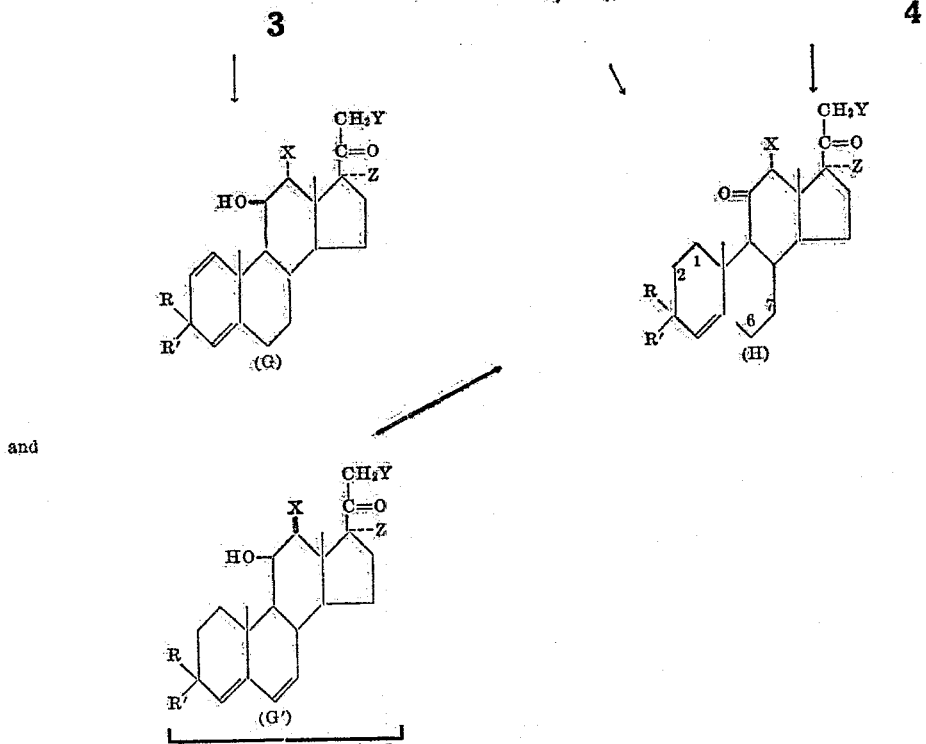

wherein the 1,2; 4,5; and 6,7-positions are double-bonded or saturated, and wherein individually R is hydrogen, R' is hydroxy, or together R and R' is oxo (keto) or a group convertible thereto by hydrolysis (e.g. ketal), R and R' as keto being preferred, X is halogen [preferably a halogen of atomic weight greater than 18 and less than 36 (i.e. chlorine or fluorine)], Y is hydrogen, hydroxy, or acyloxy, Z is hydrogen or α-hydroxy, and GBr is an N-bromamide (including imide) of a carboxylic acid (including derivatives).

Compounds suitable as initial reactants in the process of this invention include preferably $\Delta^{11}$-pregnene-3,20-diones and $\Delta^{11}$-pregnene-21-ol-3,20-diones and esters thereof [particularly carboxylic acid esters such as hydrocarbon carboxylic acid esters having less than ten carbon atoms in the acid moiety, as exemplified by the lower alkanoic acid esters (e.g. the acetate, propionate, butyrate, and enanthate) and the monocyclic hydrocarbon aromatic carboxylic acid esters (e.g. the benzoate)], although other starting materials may also be used, such as: $\Delta^{4,11}$-pregnadiene-3,20-dione; $\Delta^{4,11}$-pregnadiene-21-ol-3,20-dione and esters thereof; $\Delta^{4,11}$-pregnadiene-17α-ol-3,20-dione; $\Delta^{4,11}$-pregnadiene-17α,21-diol-3,20-dione and esters thereof; $\Delta^{11}$-pregnene-17α-ol-3,20-dione; $\Delta^{11}$-pregnene-17α,21-diol-3,20-dione and esters thereof; $\Delta^{1,4,11}$-pregnatriene-3,20-dione; $\Delta^{1,4,11}$-pregnatriene-17α-ol-3,20-dione; $\Delta^{1,4,11}$-pregnatriene-21-ol-3,20-dione and esters thereof; $\Delta^{1,4,11}$-pregnatriene-17α,21-diol-3,20-dione and esters thereof; $\Delta^{4,6,11}$-pregnatriene-3,20-dione; $\Delta^{4,6,11}$-pregnatriene-17α-ol-3,20-dione; $\Delta^{4,6,11}$-pregnatriene-21-ol-3,20-dione and esters thereof; and $\Delta^{4,6,11}$-pregnatriene-17α,21-diol-3,20-dione and esters thereof.

These compounds are reacted with a compound of the formula GBr, wherein GBr is as above-defined, and is preferably an N-bromamide of a lower alkanoic acid (e.g. N-bromacetamide), an N-bromamide of a lower alkendioic acid (e.g. N-bromosuccinimide), or dibromodimethylhydantoin. This reaction is optimally carried out in the presence of a strong acid (e.g. perchloric acid) whereby the desired brominated product is formed to the exclusion of undesired by-products.

The reaction results in the production of Compounds A (preferably wholly saturated and of cis-configuration in the 5-position), which are then reacted with a basic reagent, such as an alkali metal salt of a weak organic acid (e.g. an alkali metal acetate or carbonate) or an alkali metal hydroxide (e.g. potassium hydroxide), in a suitable solvent such as alcohols, lower alkanoic acids, or ketones (preferably in an alkanol such as methanol or ethanol) to form the 11β,12β-epoxy derivatives of this invention, Compounds B.

Compounds B are then reacted with a hydrogen halide (e.g. hydrobromic, hydroiodic, and preferably hydrofluoric or hydrochloric acid) in a suitable solvent, such as a halogenated alkane (e.g. chloroform), an alcohol (e.g. methanol), or an ether (e.g. dioxane). By this reaction, Compounds C are formed, wherein the 12α-halo substituent corresponds to the halide of the hydrohalic acid of the reaction. If hydrobromic acid is used, Compounds A are re-formed; otherwise, new steroid derivatives having a 12α-halo and 11β- hydroxy substituent are obtained.

If the initial reactant or the intermediate Compounds A and B are saturated in the 1,2; 4,5; and 6,7 positions (such intermediates being preferred), the resulting inactive Compounds C can be converted to physiologically active steroids by introducing a double-bond in the 4,5-position. This may be done by: (1) reacting Compounds C, wherein the steroid nucleus is saturated and of the pregnane configuration, with approximately one mole of bromine per mole of steroid, thereby forming Compounds D containing a 4β-bromo substituent, and dehydrobrominating as by treatment with an alkali metal halide (such as an alkali metal chloride, as exemplified by lithium chloride) or with a hydrazine derivative (e.g. dinitrophenylhydrazine or semicarbazide) to form the corresponding hydrazone or semicarbazone, followed by decomposition of the latter with a keto acid (e.g. pyruvic acid) to prepare a $\Delta^4$-pregnene, Compounds E, which correspond to Compounds C wherein the 4,5 position is double-bonded; or (2) reacting Compounds C, wherein the steroid nucleus is saturated and may be either of the pregnane or allopregnane configuration, with two moles of bromine per mole of steroid, thereby forming Compounds F containing 2,4-dibromo substituent (2α,4α if Compounds C are allopregnanes and 2β,4β if Compounds C are pregnanes), and dehydrobrominating by treatment with an organic base such as pyridine or collidine, to prepare a mixture (which is separable by chromatography) of $\Delta^{1,4}$-pregnadiene, Compounds G, and $\Delta^{4,6}$- pregnadiene, Compounds G'. These derivatives correspond to Compounds C wherein the 4,5-position and one of the positions 1,2 or 6,7 is double-bonded.

Compounds C, E, G, or G' can be oxidized, if desired, to the corresponding 11-keto derivatives, Compounds H, by treatment with an oxidizing agent such as a hexavalent chromium compound (e.g. chromic acid).

The new 12α-halo-11β-hydroxy (or 11-keto)-Δ⁴-pregnene (including the pregnadiene) steroids of this invention (Compounds E, G, G', and H) and particularly those of the general formula

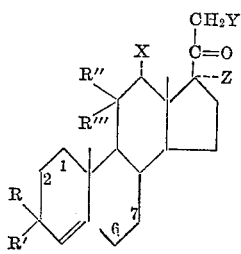

wherein the 1,2- and 6,7-positions are saturated or double-bonded; R, R', X, Y, and Z are as hereinbefore defined; and individually R'' is hydrogen, R''' is hydroxy, and together R'' and R''' represent keto or ketalized keto, are physiologically active steroids which possess glucocorticoid as well as mineralocorticoid activity. Thus, the new steroids of this invention can be administered instead of, and in the same manner as, cortisone or hydrocortisone in the treatment of rheumatoid arthritis and dermatomyositis, or in the same manner as desoxycorticosterone in the treatment of Addison's disease or adrenal insufficiencies. The dosage for such administration is, of course, dependent on the relative activity of the compound; thus, where the steroid derivative has approximately the same activity of cortisone, the dosage of the former to be employed should be approximately equal to the employed dosage of the latter. The 12α-bromo-11-keto-steroids of this invention are of further use as intermediates in the preparation of the corresponding 12-debromo derivatives, to which they are converted by treatment either with bromine in acetic acid or chromous chloride.

For the purpose of illustrating the preferred process of this invention, reference is made to the following schematic analysis employing Δ¹¹-pregnene-3,20-dione as the starting material:

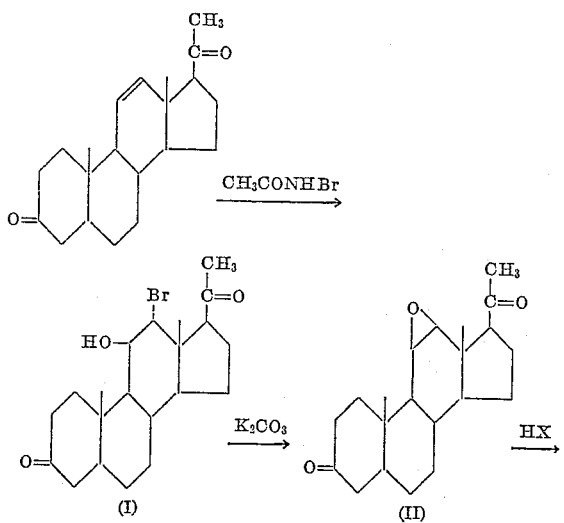

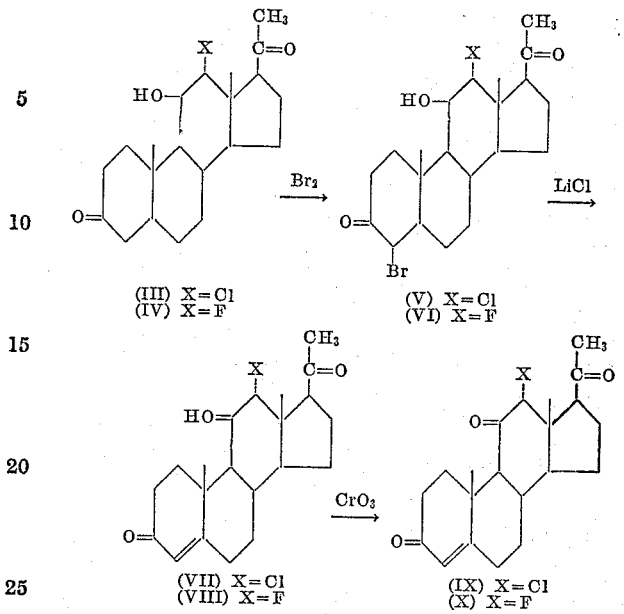

The following examples are illustrative of the invention (all temperatures being in centigrade):

EXAMPLE 1

*12α-Bromopregnane-11β-ol-3,20-Dione (I)*

To a solution of 300 mg. of Δ¹¹-pregnene-3,20-dione in 40 ml. of pure dioxane and 4 ml. of water is added 240 mg. of N-bromoacetamide and shortly thereafter 2.0 ml. of 1 N aqueous perchloric acid. After 25 minutes at room temperature 5% aqueous sodium sulfite is added to destroy the excess N-bromoacetamide and shortly thereafter 75 ml. of chloroform. After separating off the aqueous layer the chloroform layer is washed with dilute sodium bicarbonate, and water, and dried over sodium sulfate. After evaporation of the solvent in vacuo, the residue is leached with ethyl acetate leaving about 262 mg. of crystalline material, melting at about 228–230° (dec.). This material on recrystallization from tetrahydrofurane-hexane gives pure 12α-bromopregnane-11β-ol-3,20-dione, having the following properties: M.P. about 251–252° (dec.); $[\alpha]_D^{23}$ +76° (c., 0.37 in dioxane).

*Analysis.*—Calc'd. for $C_{21}H_{31}O_3Br$ (411.38): C, 61.31; H, 7.60; Br, 19.43. Found: C, 61.70; H, 7.19; Br. 19.73.

This steroid has previously been described by Hegner and Reichstein [Helv. Chim. Acta 26, 721 (1943)]. In a similar manner, Δ¹¹-pregnene-21-ol-3,20-dione 21-acetate, Δ⁴,¹¹-pregnadiene-3,20-dione and Δ⁴,¹¹-pregnadiene-21-ol-3,20-dione 21-acetate can be converted to 12α-bromopregnane-11β,21-diol-3,20-dione 21-acetate, 12α-bromo-Δ⁴-pregnane-11β-ol-3,20-dione and 12α-bromo-Δ⁴-pregnene-11β,21-diol-3,20-dione 21-acetate, respectively.

EXAMPLE 2

*11β,12β-Epoxy-Pregnane-3,20-Dione (II)*

To a solution of 271 mg. of 12α-bromopregnane-11β-ol-3,20-dione in 24 ml. of methanol is added 220 mg. of potassium carbonate in 1.2 ml. of water. The mixture is agitated at room temperature for 18 hours, after which the methanol is removed in vacuo. Extraction of the residual mixture with ether furnishes about 247 mg. of crystalline material which is recrystallized from acetone-hexane. Pure 11β,12β-epoxy-pregnane-3,20-dione has the following properties: M.P. about 139–140°; $[\alpha]_D^{23}$ +89° (c., 0.38 in chlf.);

$\lambda_{max}^{Nujol}$ 5.86μ, 5.88μ (3 and 20-keto)

*Analysis.*—Calc'd. for $C_{21}H_{30}O_3$ (330.45): C, 76.32; H, 9.15. Found: C, 76.15; H, 8.90.

Similarly, 12α - bromopregnane-11β,21-diol-3,20-dione 21-acetate, 12α-bromo-Δ⁴-pregnene-11β-ol-3,20-dione and 12α-bromo-Δ⁴-pregnene-11β,21-diol-3,20-dione 21-acetate, can be converted to 11β,12β-epoxy-pregnane-21-ol-3,20-dione 21-acetate, 11β,12β-epoxy-Δ⁴-pregnene - 3,20-dione and 11β,12β-epoxy-Δ⁴-pregnene-21-ol-3,20-dione 21-acetate, respectively.

EXAMPLE 3

12α-Chloropregnane-11β-ol-3,20-Dione (III)

To a solution of 63 mg. of 11β,12β-epoxy-pregnane-3,20-dione in 10 ml. of pure dioxane is added 2.5 ml. of 2.5 N-aqueous hydrochloric acid. The mixture is stirred at room temperature for 1 hour after which 30 ml. of chloroform is added. Separation of the layers followed by washing of the chloroform-dioxane phase with dilute sodium bicarbonate solution and with water and subsequent drying over sodium sulfate furnishes after evaporation of the solvent in vacuo about 65 mg. of essentially pure 12α-chloropregnane-11β-ol-3,20-dione; M.P. about 241–244° (dec.). The analytically pure substance has the following properties: M.P. about 246–248° (dec.); $[\alpha]_D^{23}$ +80° (c., 0.31 in chlf.);

$\lambda_{max}^{Nujol}$ 2.96μ (OH), 5.83 (3-keto), 5.95 (20-keto)

*Analysis.*—Calc'd. for $C_{21}H_{31}O_3Cl$ (366.92): C, 68.74; H, 8.52; Cl, 9.66. Found: C, 69.16; H, 8.50; Cl 9.36.

EXAMPLE 4

12α-Fluoropregnane-11β-ol-3,20-Dione (IV)

To a mixture of 1 ml. of methanol and 1.5 ml. of liquid hydrogen fluoride is added at −76°, 75 mg. of 11β,12β-epoxy-pregnane-3,20-dione. The resulting solution is allowed to warm up slowly to 0° and at that point another 1 ml. of hydrogen fluoride is added. The mixture is then kept at room temperature for 5 hours during which time it assumes a deep red color. Chloroform is added, the resulting solution is immersed into an ice-bath and the hydrogen fluoride neutralized by the addition of a suspension of sodium bicarbonate in water. Extraction of the chloroform solution with water gives after drying over sodium sulfate and evaporation of the solvent in vacuo about 84 mg. of an amorphous residue. The latter is chromatographed on 2 g. of sulfuric acid-washed alumina and the column eluted with 200 ml. of benzene-hexane 1:1, 300 ml. benzene-hexane 3:1 and 250 ml. of benzene. The last two eluants furnishes 12α-fluoropregnane-11β-ol-3,20-dione which after recrystallization from ethyl acetate-hexane has the following properties: M.P. about 186–187°; $[\alpha]_D^{23}$ 0°; $[\alpha]_{546}^{23}$ 0° (c., 0.29 in chlf.);

$\lambda_{max}^{Nujol}$ 2.93μ (OH), 5.86μ (3-keto), 5.92μ (20-keto); $\lambda_{max}^{alc.}$ no specific absorption If 11β,12β-epoxy-pregnane-21-ol-3,20-dione 21-acetate, 11β,12β-epoxy-Δ⁴-pregnene-3,20-dione, or 11β,12β-epoxy-Δ⁴-pregnene-21-ol-3,20-dione 21-acetate is substituted for 9β,11β-epoxy-pregnane-3,20-dione in the procedure of Example 3 or 4, the corresponding 12α-chloro-11β-hydroxy and 12α-fluoro-11β-hydroxy steroid derivatives are prepared, respectively.

EXAMPLE 5

4β-Bromo-12α-Chloropregnane-11β-ol-3,20-Dione (V)

To a solution of 50 mg. of 12α-chloropregnane-11β-ol-3,20-dione in 10 ml. of glacial acetic acid is added a drop of 10% hydrogen bromide in acetic acid and then dropwise a solution of 25 mg. of bromine in 1 ml. of glacial acetic acid. After addition of 30 mg. of solid sodium acetate the solvent is removed in vacuo and the residue taken up in chloroform. The resulting chloroform solution is washed with dilute sodium bicarbonate and water and after drying over sodium sulfate evaporated to dryness. The crystalline residue (about 75 mg.) consists of essentially pure 12α-chloro-4β-bromopregnane-11β-ol-3,20-dione, M.P. about 184–186° (dec.); $[\alpha]_D^{23}$ +100° (c., 0.5 in chlf.);

$\lambda_{max}^{Nujol}$ 2.95μ (OH), 5.78μ (4-bromo-3-ketone), 5.92μ (20-ketone)

EXAMPLE 6

4β-Bromo-12α-Fluoropregnane-11β-ol-3,20-Dione (VI)

Following the procedure of Example 5 but substituting 50 mg. of 12α-fluoropregnane-11β-ol-3,20-dione for the 12α-chloropregnane-11β-ol-3,20-dione, about 70 mg. of 4β-bromo - 12α - fluoropregnane-11β-ol-3,20-dione are obtained.

Similarly, 12α-chloropregnane-11β,21-diol - 3,20-dione 21-acetate and 12α-fluoropregnane-11β,21-diol-3,20-dione 21-acetate can be converted to 4β-bromo-12α-chloropregnane-11β,21-diol-3,20-dione 21-acetate and 4β-bromo-12α-fluoropregnane-11β,21-diol-3,20-dione 21-acetate, respectively.

EXAMPLE 7

12α-Chloro-Δ⁴-Pregnane-11β-ol-3,20-Dione [12α-Chloro-11β-Hydroxyprogesterone] (VII)

A solution of 73 mg. of 12α-chloro-4β-bromopregnane-11β-ol-3,20-dione and 135 mg. of anhydrous lithium chloride in 5 ml. of redistilled dimethylformamide is heated at 100° under nitrogen for 2½ hours. The solution is then diluted with chloroform and extracted with water, dilute sodium bicarbonate solution and again with water. After drying over sodium sulfate the solvent is evaporated in vacuo leaving a crystalline residue (about 47 mg.) of essentially pure 12α - chloro - Δ⁴ - pregnene-11β-ol-3,20-dione. The latter is obtained in pure form after recrystallization from acetone-hexane and has the following properties: M.P. about 218–220°, $[\alpha]_D^{23}$ +146° (c., 0.46 in chlf.);

$\lambda_{max}^{alc.}$ 240 mμ (ε=11,300); $\lambda_{max}^{Nujol}$ 2.95μ (OH), 5.95μ (20-keto), 6.16μ (Δ⁴-3-ketone)

12α - chloro - Δ⁴-pregnene - 11β-ol-3,20-dione possesses about one-half the activity of cortisone acetate in the rat liver glycogen assay.

EXAMPLE 8

12α-Fluoro-Δ⁴-Pregnene-11β-ol-3,20-Dione [12α-Fluoro-11β-Hydroxyprogesterone] (VIII)

Following the procedure of Example 7 but substituting 72 mg. of 12α-fluoro-4β-bromopregnane-11β-ol-3,20-dione for the 12α-chloro-4β-bromopregnane-11β-ol-3,20-dione, there is obtained about 45 mg. of 12α-fluoro-Δ⁴-pregnene-11β-ol-3,20-dione.

12α-fluoro-Δ⁴-pregnene-11β-ol-3,20-dione possesses activity equal to hydrocortisone in the liver glycogen assay.

Similarly, 4β-bromo-12α-chloropregnane - 11β,21-diol-3,20-dione 21-acetate and 4β-bromo-12α-fluoropregnane-11β,21-diol-3,20-dione 21-acetate can be converted to 12α-chlorocorticosterone 21-acetate and 12α-fluorocorticosterone 21-acetate, respectively.

EXAMPLE 9

12α-Chloro-Δ⁴-Pregnene-3,11,20-Trione [12α-Chloro-11-Ketoprogesterone] (IX)

To a solution of 10 mg. of 12α-chloro-Δ⁴-pregnene-11β-ol-3,20-dione in 1 ml. of glacial acetic acid is added a solution of 3.5 mg. of chromium trioxide in 1 ml. of glacial acetic acid. Ten minutes later the chromium trioxide is destroyed by the addition of ¼ ml. of ethanol and the solution concentrated to a syrup in vacuo. The residue is taken up in chloroform and extracted with water, dilute sodium bicarbonate and again with water. After drying over sodium sulfate the chloroform is evaporated in vacuo and the semi-crystalline residue chromatographed on 200 mg. of sulfuric acid-washed alumina. Elution of the column with a mixture containing 25% benzene and 75% hexane furnishes crystalline material which on recrystallization from 95% ethanol melts at about 170–173°;

$$\lambda_{max.}^{alc.} \ 236 \ m\mu \ (\epsilon = 9,000)$$

12α-chloro-Δ⁴-pregnene-3,11,20-trione possesses about ½ the activity of cortisone acetate in the rat liver glycogen assay.

EXAMPLE 10

*12α-Fluoro-Δ⁴-Pregnene-3,11,20-Trione [12α-Fluoro-11-Ketoprogesterone] (X)*

Following the procedure of Example 9 but substituting 10 mg. of 12α-fluoro-Δ⁴-pregnene-11β-ol-3,20-dione for the 12α-chloro-Δ⁴-pregnene-11β-ol-3,20-dione, there is obtained 12α-fluoro-Δ⁴-pregnene,3,11,20-trione.

In a similar manner, 12α-chlorocorticosterone 21-acetate and 12α-fluorocorticosterone 21-acetate can be oxidized to 12α-chloro-11-dehydrocorticosterone acetate and 12α-fluoro-11-dehydrocorticosterone acetate, respectively.

The invention may be otherwise embodied within the scope of the appended claim.

We claim:

11β,12β-epoxypregnane-3,20-dione.

References Cited in the file of this patent

UNITED STATES PATENTS

| | | |
|---|---|---|
| 2,554,882 | Rechstein | May 29, 1951 |
| 2,782,211 | Wettstein et al. | Feb. 19, 1957 |

OTHER REFERENCES

Fieser et al.: Natural Products Related to Phenanthrene, 1949.